Nov. 15, 1932.  K. KUMPMANN, SR  1,887,649
NUT TAPPING MACHINE
Filed June 4, 1929
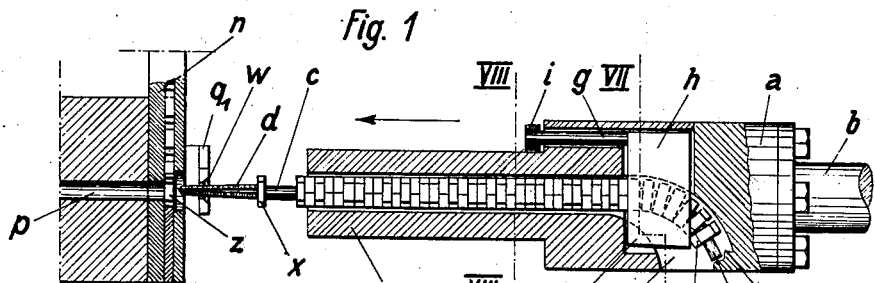
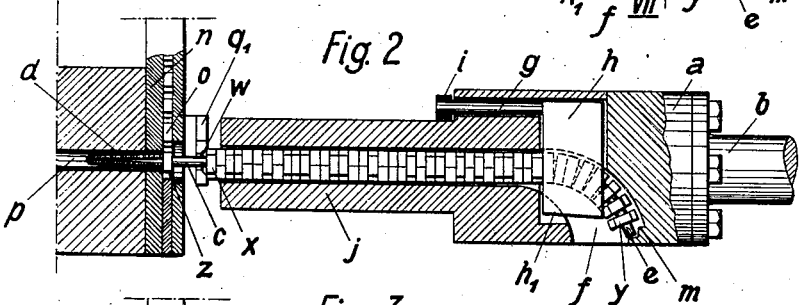
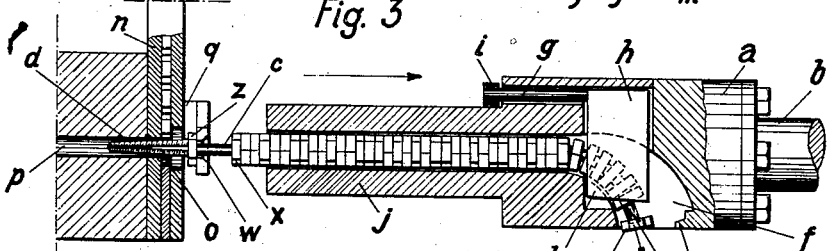
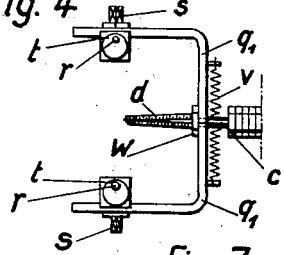
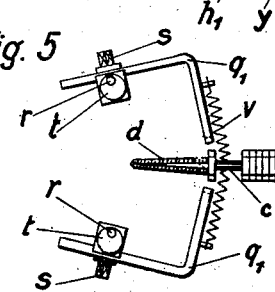
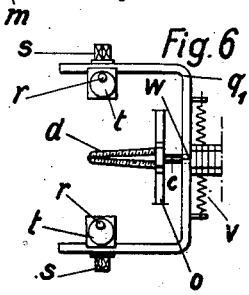
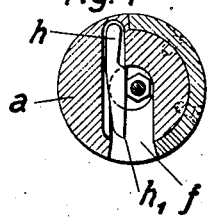
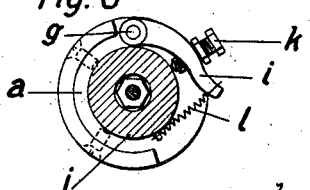
Inventor
Carl Kumpmann sr.

Patented Nov. 15, 1932

1,887,649

UNITED STATES PATENT OFFICE

KARL KUMPMANN, SR., OF LUDENSCHEID, GERMANY

NUT TAPPING MACHINE

Application filed June 4, 1929, Serial No. 368,313, and in Germany March 20, 1929.

This invention relates to a nut tapping machine with cutter guiding the nuts and with revolving tool. In machines of this type the tool is usually fitted with a long shaft of circular cross section which, in conjunction with the thread cutter proper extends first in straight line, merges then generally into a curved portion, often continued by an arm bent at right angles with regard to the straight shaft.

The diameter of the cutter shaft corresponds to the inner diameter of the hole in the nuts. The cutter is located in a channel of the cylindrical cutter head corresponding to the shape of the shaft of the cutter, open at both ends, its inner diameter being circular, for hexagonal nuts, and approximately equal to the diameter of the circumferential circle of the nuts or four sided for four edged nuts, and adapted to the profile of the nut. The cutter is held and centered in the cutter head by the cut nuts which, following closely the one behind the other in the channel of the cutter head, are stringed on the shaft of the cutter and are fed the distance of the thickness of one nut at the cutting of a fresh nut, the nut at the beginning of the string of nuts and at the end of the cutter head-channel being delivered from the cutter head. In order to prevent the nuts, which, as soon as they have arrived on the curved and radial portion of the cutter, are submitted to the action of the centrifugal force at the revolving of the cutter head, from yielding to this centrifugal force, braking devices are provided at the delivery end of the guide channel for braking the nuts, so that the string of nuts throughout the whole cutter head remains continuous. Nut tapping machines have become known which have no braking device, this being however of no consideration for the present invention.

When the string of nuts is extending over the entire length of the shaft of the cutter, the cutter must not only cut the female thread but at the same time carry out the work of feeding the string of nuts which, at every tapping of a nut, has to be pushed a distance equal to the thickness of a nut along the shaft of the cutter or through the channel of the cutter head towards the delivering end. The cutter, besides carrying out this feeding work, must further overcome the resistance of the braking element designed to prevent premature ejecting of the nuts under the action of the centrifugal force. Additional stresses are thereby produced on the cutter, and thin cutters, as for instance required for tapping small nuts, are not capable to withstand these stresses.

According to the invention a separate device arranged on the outer side of the cutter head in closest proximity to the feeding chute for the nuts and designed to receive and to centre the free unsupported portion of the cutter projecting from the cutter head, is used to shift the string of nuts on the cutter a distance equal to the thickness of a nut and to shift to and fro the cutter with the string of nuts in the cutter head which for this purpose is specially constructed, the nut closest to the delivering port in the cutter head being pushed away from the string of nuts and ejected, owing to this individual movement of cutter and string of nuts in the cutter head. The cutter itself is thereby absolutely relieved of the work of feeding the nuts.

An embodiment of the invention is illustrated by way of example in the accompanying drawing in which:

Fig. 1 shows in vertical section a cutter head with slipping bearing for the nuts.

Figs. 2 and 3 are similar sections, showing each another position of the cutter head.

Figs. 4, 5 and 6 show position of the centering means during the return movement of the cutter, during the passage of the tapped nut between the bows and at the termination of the tapping operation respectively.

Fig. 7 is a section on line VII—VII of Fig. 1 and

Fig. 8 is a section on line VIII—VIII of Fig. 1.

The tool axis is horizontal. The cutter head consists of a cylindrical body $a$ screwed on the revolving machine shaft $b$, and it executes at every operation an axial reciprocating movement. The cutter $d$ consists of a longer straight portion $c$ and of a curved portion $e$ resting both in an accordingly shaped channel of the cutter head. The diameter of the channel is approximately equal to the greatest diameter of the nuts. The diameter of the cutter shaft is somewhat smaller than the inner diameter of the hole in the nuts. The curved channel $f$ for the nuts is enlarged in funnel-shape towards the delivering end, different in this respect from the usual construction. This enlargement is preferably situated in the plane of the curvature, the channel being however somewhat enlarged also perpendicularly to this plane of curvature as shown in Fig. 7. In the cutter head, opposite the channel $f$, a steel plate $h$ is oscillatably mounted by means of a stud $g$ parallel to the axis of the cutter head. The face of plate $h$ facing the string of nuts is lightly rounded in the direction of the arriving nuts in order to facilitate the movement of the nuts. On the outer end of the pivot stud $g$ a lever $i$ is arranged in which, as shown in Fig. 8, an adjusting screw $k$ is mounted which bears against the bush $j$ of the cutter head, a pull string $l$, attached at one end to the bush $j$, being attached at the other end to the free end of the lever $i$. This arrangement determines the position of plate $h$ with regard to the string of nuts and equalizes wear. The lower edge $h'$ of the plate $h$ is inclined, the point $h^2$ produced by the inclination standing directly opposite the first nut $y$ of the string of nuts (Fig. 1). In the cutter head a ledge $m$ is arranged directly at the mouth of the radial channel, designed to serve as support for the rear end of the cutter shaft.

Opposite the point of the cutter the feed chute for the nuts with the bearing $o$ and having a channel $p$, in a manner known per se, is arranged, said channel $p$ designed to receive the cutter at the tapping of the nut.

A centering device, consisting of two oscillatable bows $q$, is connected to the body of the feeding chute or to the bearing in the same. The arm $q'$ of each bow $q$ extends transversely in front of the bearing of the feeding chute. The ends of the arms $q'$ overlap at the centre of the bearing, and each arm has a semicircular hole, said semicircular holes together forming a hole the diameter of which is equal to the thickness of the cutter.

The parallel arms of the bows $q$ are horizontal and oscillatably mounted on bolts $r$ with which they are connected by clamping screws $s$ having each a square stud $t$ loosely rotating around the pivot bolts $r$. The cutter in operation is centrally guided by the bows $q$ directly opposite the nut bearing $o$. When the cutter carrying the cut nut $x$ is being pulled back, the bows $q$ are forced apart in outward directions by the nut $x$ and allow it to pass. When the cutter is advanced again, the bows $q$ push the tapped nuts $x$ along the cutter shaft. The nut $x$ which has just been cut, is, as shown in Fig. 1, not yet in the string but rests on the end of the cutter $d$, when this cutter comes into contact with the lowermost nut $z$ in the feeding chute. The first nut $y$ of the string is then, as shown in Fig. 1, still somewhat above the edge $h'$ of the steel plate $h$. As soon as the fresh nut $z$ has been tapped, the cutter assumes the position shown in Figs. 2 and 6. The loose nut $x$ has been pushed by the bows $q$ against the string of nuts, whereby the whole string of nuts has been pushed back the thickness of one nut. The first nut $y$ of the string, which has assumed the position shown in Fig. 2, is situated so that its surface facing the next following nut is lying under the edge $h'$ or under the point of the plate $h'$. After the fresh nut $z$ has been tapped, the cutter head $a$ moves in the direction of the arrow line (Fig. 3), so that the nut $z$ bears against the closed bows $q$ (Figs. 3 and 4), the cutter and with the same the string of nuts remaining in their position, when the cutter head $a$ continues its shifting movement in the direction of the arrow line (Fig. 3). This can take place until the curved portion $e$ of the cutter shaft and the nuts on the same bear again strongly against the front face of the funnel-shaped channel mouth. The bows $q$ are opened, as shown in Fig. 5 when the cutter head continues then to move in the direction of the arrow line (Fig. 3).

When the cutter and the string of nuts move from the position shown in Figs. 1 and 2 into the position shown in Fig. 3, the edge $h'$ of plate $h$ or the point formed by said edge slips over the upper surface of the first nut $y$ which is thus ejected as shown in Fig. 3.

I claim:—

1. A nut tapping machine, comprising in combination a cutter head adapted to rotate and reciprocate having a central bore with downwardly curved and enlarged portion at its rear end, a cutter shaft in and projecting from the front end of said bore, a tool on the front end of said shaft, a centering device pivotally mounted in front of said cutter head adapted to guide the portion of said shaft projecting from said cutter head and to successively shift the finished nuts onto said shaft at the forward movement of the cutter head to form a string of nuts on said shaft, a spring controlled plate oscillatably mounted in the enlarged portion of said cutter head bore tangentially to the string of nuts on said shaft, the lower edge of said plate adapted to press against the upper surface of the first nut of the string of nuts and to eject said first nut from said cutter shaft during the movement of said cutter head.

2. A nut tapping machine as specified in claim 1, comprising in combination with the reciprocating rotary cutter head having a central bore with downwardly curved and enlarged portion at its rear end and the spring controlled plate oscillatably mounted in the enlarged portion of said cutter head bore, a pivot stud on said plate mounted in said cutter head parallel to the axis of the same, a lever on the outer end of said stud, a spring attached to said cutter head acting upon the free end of said lever, and an adjusting screw in said lever adapted to regulate the position and pressing force of said plate.

3. In a nut tapping machine, the combination of a reciprocating and rotary cutter head, a shaft in said cutter head adapted to move backwards and forwards in said cutter head and carrying a string of finished nuts, a centering device in front of said shaft consisting of two oscillatable bows each having an inwardly bent end normally engaging with each other and having each a semi-circular incision in the end face said incisions adapted to form together a circular hole of the same diameter as said cutting shaft, said bows adapted to move apart under pressure exerted by the last finished nut on said shaft to allow the passage of this last finished nut at the backward movement of said cutter head and to arrest and shift the strings of finished nuts a distance equal to the width of one nut on said cutter shaft at the forward movement of said cutter head.

In testimony whereof I affix my signature.

KARL KUMPMANN, Sr.